United States Patent [19]

Hawes

[11] Patent Number: 5,753,339
[45] Date of Patent: May 19, 1998

[54] CATALYTIC CONVERTER SUBSTRATE WITH A PLURALITY OF CELL GROUPS HAVING HIGH AND LOW THERMAL MASS WALLS

[75] Inventor: Slater William Hawes, Fenton, Mich.

[73] Assignee: General Motors Corporation, Detroit, Mich.

[21] Appl. No.: 694,587

[22] Filed: Aug. 9, 1996

[51] Int. Cl.$^6$ ................... B32B 3/12; B01J 35/04
[52] U.S. Cl. .............. 428/116; 428/118; 428/131; 422/171; 422/180; 422/222; 422/169; 422/168
[58] Field of Search .................. 428/116, 118, 428/131; 422/171, 180, 222, 169, 168

[56] References Cited

U.S. PATENT DOCUMENTS

| | | | |
|---|---|---|---|
| 4,025,462 | 5/1977 | Cleveland | 264/63 |
| 4,348,360 | 9/1982 | Chang et al. | 428/118 |
| 4,448,828 | 5/1984 | Mochida et al. | 428/36 |
| 4,810,554 | 3/1989 | Hattori et al. | 428/116 |
| 4,840,827 | 6/1989 | Mizutani et al. | 428/116 |
| 5,108,685 | 4/1992 | Kragle | 428/116 |
| 5,376,345 | 12/1994 | Pfefferle | 423/213.2 |
| 5,390,494 | 2/1995 | Clegg | 60/299 |
| 5,456,965 | 10/1995 | Machida et al. | 428/116 |

*Primary Examiner*—William Watkins
*Attorney, Agent, or Firm*—Anthony Luke Simon

[57] ABSTRACT

A catalytic converter substrate comprising: a plurality of cell groups, each cell group comprising a plurality of air-flow cells extending axially through the substrate, each cell group comprising a first set of walls defining a radially outer periphery thereof and a second set of walls suspended by the first set of walls partitioning the individual air-flow cells from each other, wherein the first set of walls has a first effective thermal mass and the second set of walls has a second effective thermal mass, wherein the first effective thermal mass is greater than the second effective thermal mass.

9 Claims, 2 Drawing Sheets

5,753,339

CATALYTIC CONVERTER SUBSTRATE WITH A PLURALITY OF CELL GROUPS HAVING HIGH AND LOW THERMAL MASS WALLS

This invention relates to a catalytic converter substrate.

BACKGROUND OF THE INVENTION

Catalytic converter substrates have been constructed from extruded ceramics, typically having cell walls of uniform thickness in the range of 0.004 to 0.012 inches. Converter substrates have also been constructed from extruded metal, typically having cell walls of uniform thickness in the range of 0.002 inches or greater. Practical limits on the cell wall thickness arise from the requirement of structural integrity of the substrate. That is, when the cell walls are too thin, the substrate lacks the structural strength necessary to survive for sufficient time in a catalytic converter installed in an automotive vehicle.

SUMMARY OF THE PRESENT INVENTION

A catalytic converter substrate in accordance with the present invention is characterized by the features specified in claim 1.

Advantageously, this invention provides a catalytic converter substrate that allows use of thinner substrate walls while maintaining substrate integrity. Advantageously, by allowing use of thinner substrate walls, the catalytic converter substrate according to this invention has a lower thermal mass and, when placed in a catalytic converter for use in a vehicle, allows the catalyst coating the substrate to heat to light off temperature sooner after startup of the vehicle. Advantageously, then this invention provides a catalytic converter substrate that can be used as a fast light-off device in a vehicle emissions control system, allowing the effective reduction of undesirable tail pipe emissions during and after start-up of the vehicle.

Advantageously, this invention provides a catalytic converter substrate with a unique structure that allows the implementation of the thin walls while maintaining structural integrity. More particularly, the substrate structure includes a combination of thick and thin walls defining the substrate air-flow cells. The thick walls are interconnected to provided structural integrity and, for example, may run in two directions (i.e., horizontal and vertical) perpendicular to the axis of the substrate. The thick walls define borders of cylindrical cell groups that run the length of the substrate. The cell groups within the thick wall borders are individually defined by thin walls interconnected within the thick wall borders. The thin walls of the cell groups provide a low thermal mass within the confines of the thick wall borders, which constitute a higher thermal mass. Thus the example substrate comprises a plurality of cell groups running the axial length of the substrate, each cell group defined by thin walls radially bordered by thick walls, wherein the thin walls define a low thermal mass capable of quickly reaching light-off temperature and wherein the thick walls provide structural support for the substrate.

According to one example of this invention, a catalytic converter substrate is provided comprising a plurality of cell groups, each cell group comprising a plurality of air-flow cells extending axially through the substrate, each cell group comprising a first set of walls defining a radially outer periphery thereof and a second set of walls suspended by the first set of walls partitioning the individual air-flow cells from each other, wherein the first set of walls has a first effective thermal mass and the second set of walls has a second effective thermal mass, wherein the first effective thermal mass is greater than the second effective thermal mass.

In a preferred example, the substrate comprises an extruded ceramic and the walls of the second set have a thickness in a range of about 0.002 inches and less while the walls of the first set have a thickness of at least about 0.004 inches.

BRIEF DESCRIPTION OF THE DRAWINGS

The present invention will now be described by way of example with reference to the accompanying drawings in which.

DETAILED DESCRIPTION OF THE INVENTION

Figure 1:
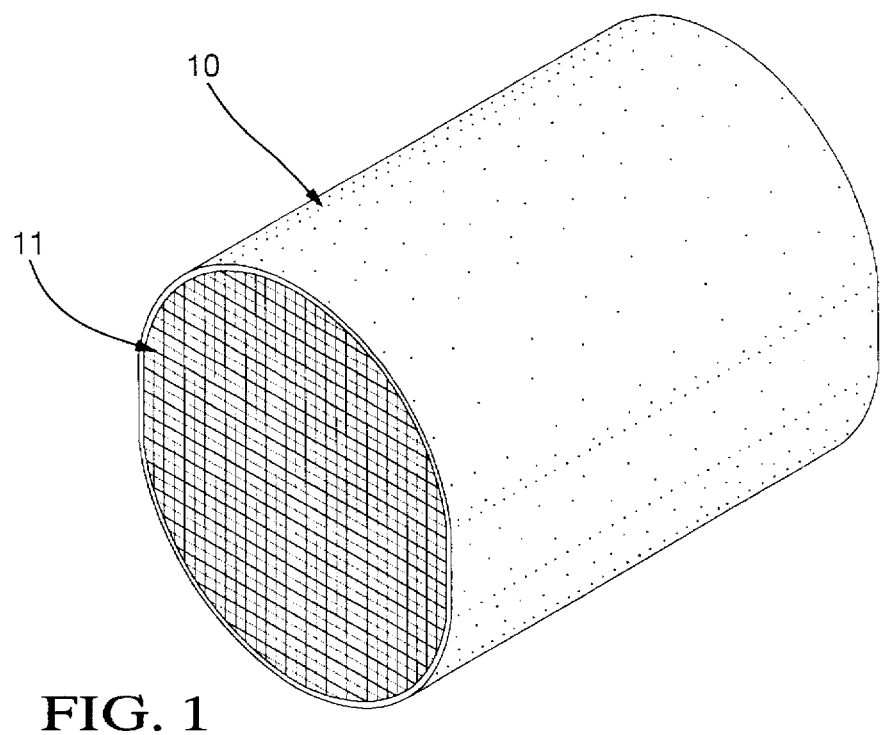
FIG. 1 illustrates a perspective view of an example substrate according to this invention.

Referring now to figure 1A, No 2 the end 11 of an example substrate 10 according to this invention is shown illustrating an advantageous cell wall structure. The substrate has an outer wall 13 and a plurality vertical walls 14 and horizontal walls 16. The walls 13, 14 and 16 are referred to as the thick walls. The thick walls 14 and 16 are interconnected and define a plurality of cell groups 12 within which individual air flow cells 15 are defined by the horizontal walls 20 and the vertical walls 18. The walls 18 and 20 are referred to as the thin walls.

Figure 2:
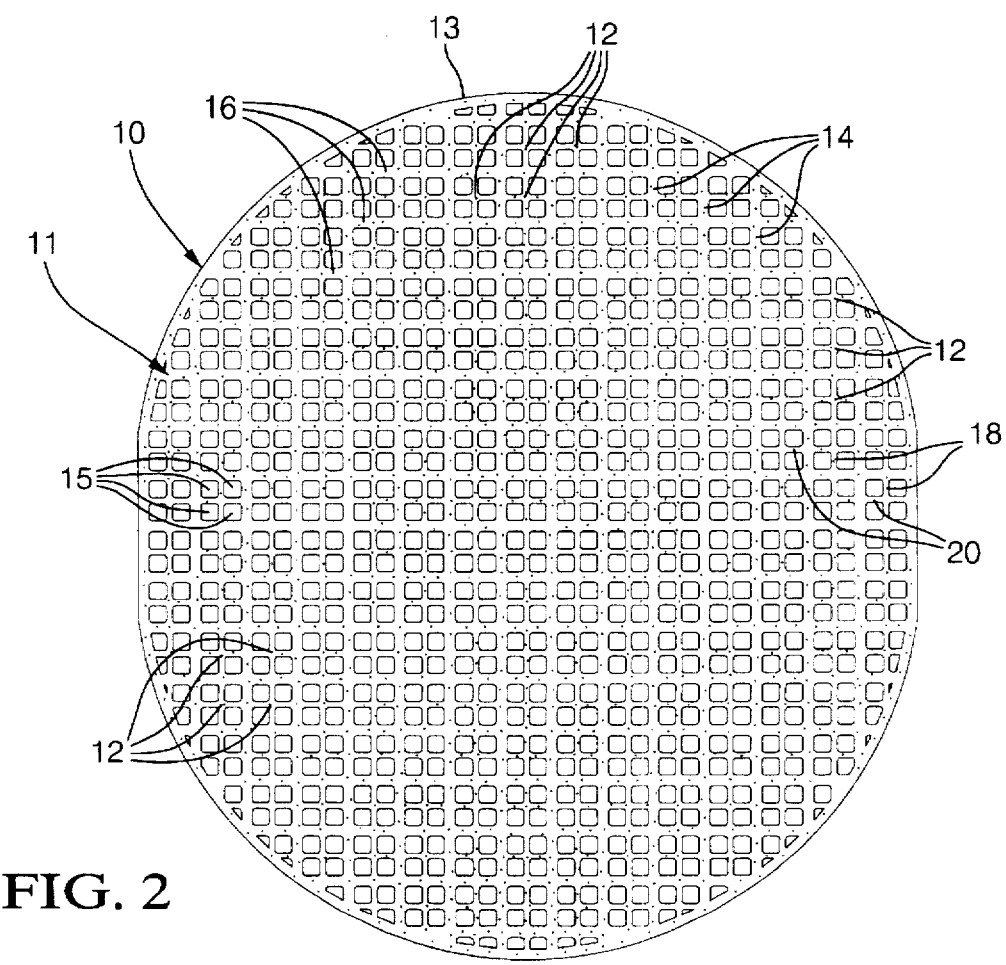
FIG. 2 illustrates a End view of example substrate according to this invention.

The individual air flow cells 15 extend through the axial length of the substrate 10 as do the thick walls 13, 14 and 16 and the thin walls 18 and 20. A perspective view of the substrate 10 is shown in figure 2. Each cell group 12 comprising a plurality of air flow cells 15 is cylindrical in shape bounded radially by the exterior thick walls 14, 16 and extending axially through the substrate 10.

In an example in which the substrate 10 is formed of extruded ceramic, the thick wall 13, 14, 16 have a thickness of at least about 0.004 inches and preferably on the order of 0.006 inches to give the substrate structural integrity, preventing collapse of the structure during the operational life of the substrate within a catalytic converter. The thin walls 18, 20 are provided, for example, with a thickness of about 0.002 inches or less. As is apparent to those skilled in the art, the walls 14, 16, 18, 20 in figure 2 are not drawn to scale (for sake of clarity of wall structure) and, in actual implementation, the typical substrate comprises many more walls 14, 16, 18, 20 defining many more air flow cells 15 per square inch than shown in the figure.

An advantage provided by the structure of the walls 14, 16, 18, 20 shown in figure 2 is that each of the cell groups 12, comprising a plurality of individual air flow cells 15, is bounded in the radial periphery by thick walls 14, 16, providing structural strength to the cell group. The thin walls 18, 20 provide the partitioning of the individual cells 15. When assembled into a catalytic converter assembly and installed on a vehicle, all of the walls 14, 16, 18, 20 are coated with a catalyst wash-coat of a known type that, upon reaching a "light-off" temperature, stimulates reactions of exhaust gasses flowing through the individual air flow cells to reduce the presence of undesirable gas species within the exhaust gas.

An advantage provided by this invention occurs in the time between when the vehicle engine is started from a "cold start" —that is the engine has not been running in a while and the catalyst temperature at engine start-up is substantially that of the surrounding environment—and when the entire substrate 10 reaches light-off temperature, having been heated by the engine exhaust gasses flowing through the substrate 10. In a typical vehicle, the front of the catalyst substrate reaches light-off temperature first and in the time period before any part of the substrate reaches light-off temperature, the catalytic converter is not operational to stimulate the reduction of the undesirable species of exhaust gases and those undesirable species escape from the tail pipe into the air.

The time period it takes for the substrate 10 to reach light-off temperature depends, in part, upon the thermal mass of the substrate 10. A substrate with a lower thermal mass is quicker to be heated by the exhaust gases of the internal combustion engine. One method of reducing the thermal mass of a substrate is to reduce the thickness of the substrate walls. However, using conventional extruded ceramics, substrate wall thickness has been limited to no less than about 0.004 to 0.006 inches because, when made with thinner walls, for example in the 0.002 inch range, substrates using conventional ceramics have not had structural integrity to provide sufficient durability in the automotive environment. For example, the substrate may collapse in on itself.

However, according to this invention, a substrate with thin walls, for example in the 0.002 inch range or less, is provided, providing lower thermal mass and reducing the time it takes for the first portions of substrate 10 to reach light-off temperature. More particularly, following engine start-up, while the catalytic converter is warming up, the thin walls 18, 20, closer to the center of the cell groups 12, are the portions of the substrate structure representing the lowest thermal mass and reach light-off temperature quicker than the thick walls 14, 16. Once the thin walls 18, 20 reach light-off temperature, the catalyst coating the substrate begins the catalytic activity of reducing the undesirable species of exhaust gases.

Thus by providing portions of low thermal mass within the substrate structure that reach light-off temperature quicker, the catalytic converter begins the catalytic activity reducing undesirable tailpipe emissions faster after a cold start than a catalytic converter with a conventional catalyst structure. This advantage of quicker time to reach light-off temperature is achieved without the requirement of supplemental heating, i.e., by electric or fuel-fed heaters.

The thick walls 14,16 provide the strength preventing structural collapse of the substrate in the harsh automotive environment. While the catalytic converter is warming up, the cell groups 12 exist as cylinders extending the axial length of the substrate, bounded on the radial exterior by the thick walls 18, 20, with the thin walls 14, 16 at the radial center of the cell groups comprising the hottest portions of the substrate. An example thermal mass of a typical substrate ceramic is 0.027 Joules/°C./cm² for walls 0.006 inches thick and 0.009 Joules,°C./cm² for walls 0.002 inches thick. To illustrate relative strengths, a wall of 0.006 inches can withstand stress of 4.5 kg/cm while a wall of 0.002 inches can withstand a stress of 1.5 kg/cm.

Figure 3:
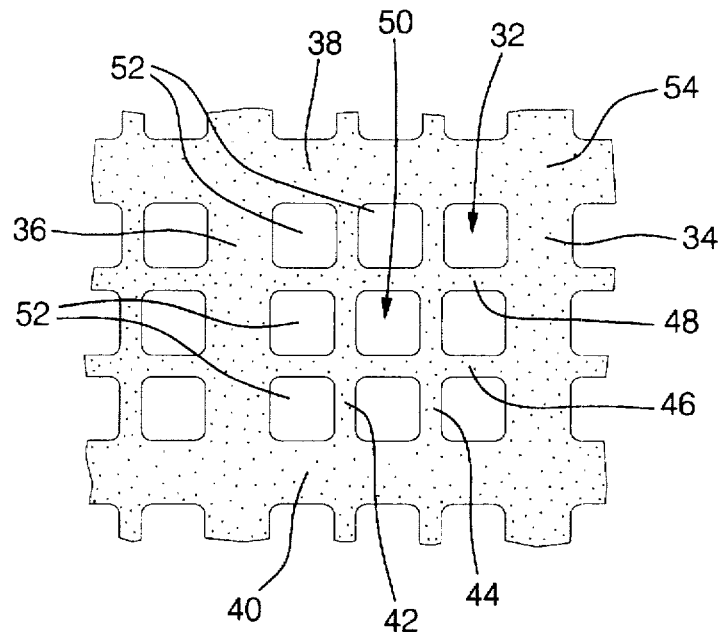
FIG. 3 illustrates an end view of an example cell group of a substrate according to this invention.
Figure 4:
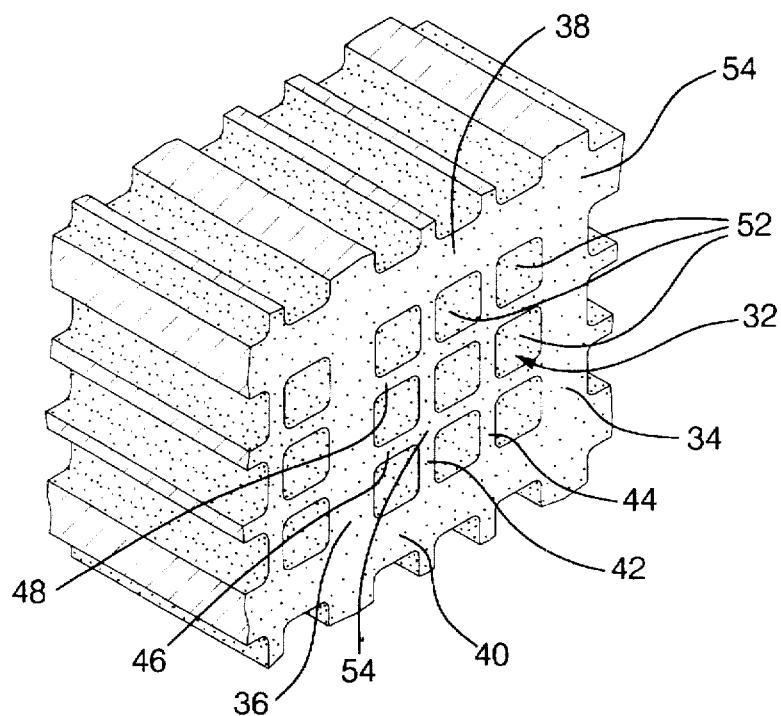
FIG. 4 illustrates another view of the example cell group of FIG. 3.

Referring now to FIGS. 3 and 4, two views of another example cell group according to this invention show cell group 32 comprising individual air flow cells 52. The cell group 32 is bounded on the radially outer periphery by the thick walls 38 and 40 on the top and bottom and by thick walls 36 and 34 on the left and right. Suspended by the thick walls 34, 36, 38 and 40 are the thin walls 42 and 44, provided vertically, and 46 and 48, provided horizontally. The thin walls 42, 44, 46, 48 divide the space on the interior of the cell group 32 into the individual air flow cells 52. An example thickness for the thick walls 34, 36, 38, 40 is 0.006 inches and an example thickness for the thin walls 42, 44, 46, 48 is 0.002 inches. The thick walls 34, 36, 38 and 40 represent the portion of the cell group 32 with the highest structural strength and the thin walls 42, 44, 46 and 48 represent the portion of the cell group 32 with the lowest thermal mass.

When installed in a catalytic converter on a vehicle, with exhaust gases flowing through the substrate after a cold-start, the thin-walls 42, 44, 46, 48 closest to the center 50 of the cell group heat up fastest and are the first part of the cell group to reach light-off temperature, beginning the desirable catalytic reaction of the exhaust gasses passing through the substrate 10. As mentioned above, it is typically the portion of the substrate closest to the internal combustion engine that reaches light-off temperature first, thus, the thin walls 42, 44, 46, 48 closest to the front end 54 of the substrate are the portions likely to first reach light-off temperature.

Like the cell groups 12 in figure 2, the thick walls 34, 36, 38 and 40 are interconnected throughout the substrate to provide structural strength not just to the individual cell groups 32 but to the entire substrate. Thus each cell group is connected to neighboring cell groups through the thick walls. This can be achieved as in the example in FIG. 1 through a series of horizontal and vertical walls.

While the examples shown include horizontal and vertical thick walls, other configurations for the thick walls can be provided. Simple variations from the examples shown include providing the thick walls so that they define the cell groups as rectangles or parallelograms instead of as square-shaped. Additionally, the cell groups can have more complex shapes, i.e., hexagonal, as long as the thick walls from the various cell groups are interconnected to give an overall structural rigidity to the substrate. Further the thin walls need not define individual air-flow cells of square shape but can define air-flow cells of any shape limited only by the limitations of the extrusion die design.

While the above example refers to a ceramic substrate, the same structure can be used for an extruded metal substrate. In the case of an extruded metal substrate, the cell walls may be thinner, i.e., the thick walls may be in the 0.002 inch thick and greater range and the thin walls less than 0.002 inches thick.

I claim:

1. A catalytic converter substrate comprising:
   a plurality of cell groups, each cell group comprising a plurality of air-flow cells extending axially through the substrate, each cell group comprising a first set of walls defining a radially outer periphery thereof and a second set of walls suspended by the first set of walls partitioning the individual air-flow cells from each other, wherein the first set of walls has a first effective thermal mass and the second set of walls has a second effective thermal mass, wherein the first effective thermal mass is greater than the second effective thermal mass, wherein the second sets of walls comprise a plurality of low thermal mass portions distributed across the catalytic converter substrate, separated from each other by the first sets of walls.

2. A catalytic converter substrate according to claim 1, wherein the first set of walls has a first structural strength and the second set of walls has a second structural strength, wherein the first structural strength is greater than the second structural strength.

3. A catalytic converter substrate according to claim 1 wherein the substrate comprises an extruded ceramic and the walls of the second set have a thickness in a range of about 0.002 inches and less and the walls of the first set have a thickness of at least about 0.004 inches.

4. A catalytic converter substrate comprising:

a plurality of cell groups, each cell group comprising a plurality of air-flow cells extending axially through the substrate, each cell group comprising a first set of walls defining a radially outer periphery thereof and a second set of walls suspended by the first set of walls partitioning the individual air-flow cells from each other, wherein the first set of walls has a first thickness greater than a second thickness of the second set of walls whereby the first set of walls has a first effective thermal mass greater than a second thermal mass of the second set of walls, wherein the second sets of walls comprise a plurality of low thermal mass portions distributed across the catalytic converter substrate, separated from each other by the first sets of walls.

5. A catalytic converter substrate according to claim 4, wherein the substrate comprises an extruded ceramic and the walls of the second set have a thickness in a range of about 0.002 inches and less while the walls of the first set have a thickness of at least about 0.004 inches.

6. A catalytic converter substrate including a combination of thick and thin walls defining a set of air-flow cells, wherein the thick walls are interconnected to provided structural integrity and further define borders of cylindrical cell groups that run an axial length of the substrate, wherein the air-flow cells within the thick wall borders are individually defined by the thin walls, wherein the thin walls are interconnected within the thick wall borders, wherein the thin walls are separated into a plurality of low thermal mass portions separated by the thick wall borders, wherein the thick walls constitute a higher thermal mass than the thin walls.

7. A catalytic converter substrate according to claim 6, wherein the substrate comprises an extruded ceramic and the thin walls have a thickness in a range of about 0.002 inches and less while the thick walls have a thickness of at least about 0.004 inches.

8. A catalytic converter substrate comprising a plurality of cell groups running the axial length of the substrate, each cell group defined by thin walls bordered around an entire radial periphery of the cell group by thick walls, wherein the thin walls provide a low thermal mass capable of quickly reaching light-off temperature and wherein the thick walls provide structural support for the substrate, wherein the thin walls comprise a plurality of low thermal mass portions distributed across the catalytic converter substrate, separated from each other by the thick walls.

9. A catalytic converter substrate according to claim 8, wherein the substrate comprises an extruded ceramic and the thin walls have a thickness in a range of about 0.002 inches and less while the thick walls have a thickness of at least about 0.004 inches.

* * * * *